F. H. WINTER.
REGULATING SYSTEM.
APPLICATION FILED AUG. 13, 1919.
1,339,996.
Patented May 11, 1920.
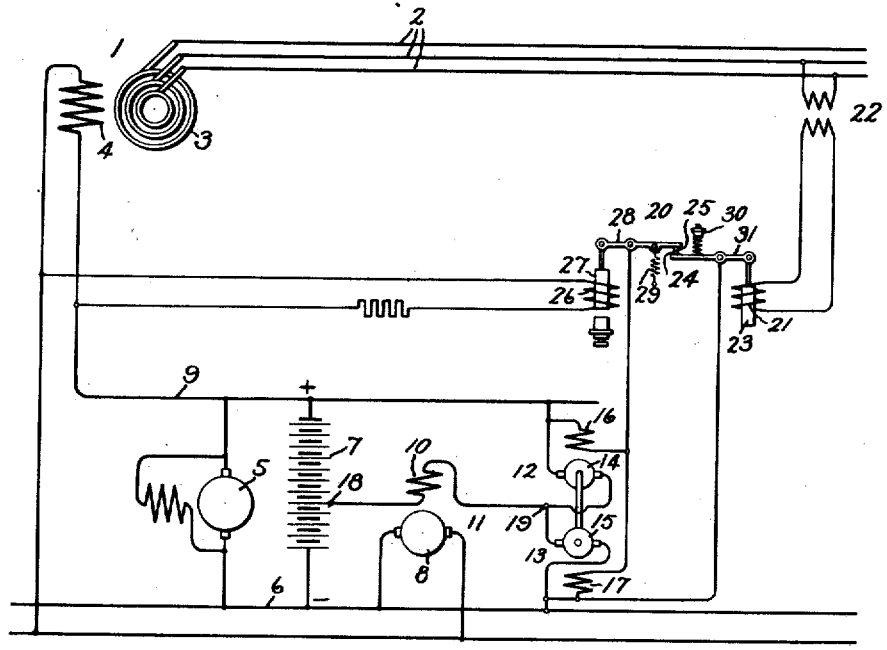
Inventor:
Fred H. Winter,
by Albert G. Davis
His Attorney.

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

REGULATING SYSTEM.

1,339,996.      Specification of Letters Patent.      Patented May 11, 1920.

Application filed August 13, 1919. Serial No. 317,315.

*To all whom it may concern:*

Be it known that I, FRED H. WINTER, a citizen of the United States, residing at Schenectady, in the county of Schenectady, State of New York, have invented certain new and useful Improvements in Regulating Systems, of which the following is a specification.

My invention relates to electric regulating systems which are adapted to maintain an electrical condition of a circuit, such as the voltage or current, substantially constant.

My invention relates especially to those systems in which the regulation is accomplished by means of a generator placed in the field circuit in series with the main exciter, and provided with means for reversing its potential in response to variations in the voltage or current of the system to be regulated. It has been the practice to produce the reversal of potential of the regulating generator by changing the direction of its field current. This has been accomplished by connecting one end of the field coil of the exciter of the regulating generator to an intermediate terminal of a battery and connecting the other end of the field coil to an intermediate point of a resistance connected across the terminals of the battery, and providing means for short-circuiting a portion of one branch of the resistance in response to variations of the condition to be regulated. The cost of this resistance, the space taken up thereby, and the energy loss therein is large so that it is very desirable to provide some other arrangement which does not use such a regulating resistance and which is cheaper and takes up less space.

One object of my invention is to provide a regulating system of the type above mentioned in which a regulating resistance is not used.

In accordance with this object of my invention I provide a regulating system comprising a regulating generator, a source of electromotive force having three terminals, each of which is at a different potential with respect to the other two terminals, connections between one of said terminals and one end of the field coil of said regulating generator, two counter electromotive force machines having their armatures connected in series across the other two of said terminals, the other end of said field coil being connected to a point between the armatures of said machines, and means for varying the fields of said counter electromotive force machines to continually reverse the field current of said regulating generator.

Other objects of my invention will appear from the following description and claims.

Referring to the drawing which illustrates one application of my invention, 1 represents a generator which is adapted to furnish power to the supply circuit 2. The generator is shown as having an armature 3 and a field winding 4. The field current is supplied, in the system illustrated, by a shunt wound exciter 5, supplemented by a battery 7, the negative terminals of the exciter and battery being connected to the negative exciter main 6. One terminal of the armature 8 of a booster 11 is connected to the negative exciter main 6, and the other terminal is connected to one end of the field winding 4 of the generator 1, the other end of the field winding 4 being connected to the positive exciter main 9, which in turn is connected to the positive terminals of the exciter 5 and the battery 7.

12 and 13 denote counter electromotive force machines comprising the armatures 14 and 15 and the field windings 16 and 17. The armatures 14 and 15 are mechanically connected together and are electrically connected in series across the exciter mains 6—9. The field windings 16 and 17 are also connected in series across the exciter mains. One end of the booster field 10 is connected to an intermediate point 18 of the battery 7 and the other end is connected to a point 19 between the armatures 14 and 15. I prefer to connect the field winding 10 to the battery in such a manner that the voltage between one of the exciter mains, such as the negative main 6, and the intermediate point 18 is less than the voltage between intermediate point 18 and the other exciter main. It will be observed that the battery has three terminals each of which is at a different potential. It is evident also that a resistance may be substituted for the battery 7 without affecting the operation.

20 denotes a vibrating device comprising a winding 21 connected by means of a potential transformer 22 to the supply circuit 2, a core 23 actuated by the winding 21, a movable arm 31 connected to be actuated by the core 21, a movable contact 24 connected to the arm 31, a movable contact 25 coöperating with the movable contact 24 and an anti-hunting device comprising a winding 26 connected across the terminals of the field winding 4, a core 27 actuated by the winding 26, and a movable arm 28 connected to be actuated by the core 27 and carrying the movable contact 25. The pull of the winding 26 is opposed by the spring 29. Contacts 24 and 25 when in engagement close a short-circuit around the field winding 17 of the counter electromotive force machine 13. The vibrating device 18 is adjusted by means of an adjustable spring 30 so that when the voltage of the circuit 2 increases above a predetermined value the core 23 will be raised, thereby disengaging contacts 24 and 25, and when the voltage of the circuit 2 decreases below the predetermined value the core 23 will be lowered, thereby causing the engagement of contacts 24 and 25.

I prefer to use counter electromotive force machines which are so designed that the counter electromotive force generated by the machine 12, when the field winding 17 is short circuited, is equal to the voltage across exciter mains 6—9, and the counter electromotive force generated by the machine 13, when the field winding 17 is energized in series with the field winding 16, is equal to a voltage across the exciter mains 6—9, and counter electromotive force generated by the machine 12, at this time, is equal to such a value that the voltage across the terminals of the field windings 10 of the booster is equal to the voltage between the intermediate point 18 of the battery and the negative exciter main 6. In order to accomplish these results I construct the field windings 16 and 17 so that resistance of the field winding 17 is much larger than the resistance of the field winding 16. Consequently, when the field winding 17 is short-circuited through contacts 24 and 25 a much larger exciting current flows through the field winding 16 than flows when the field winding 17 is in series therewith.

It is preferable to mount the armatures 14 and 15 on a common shaft.

The operation of my invention as at present understood is as follows:

Assume the supply circuit 2 to be energized and the field winding 4 of the generator 1 to be supplied with exciting current from the exciting mains 6—9.

First, supposing the voltage of the circuit 2 to be above the desired predetermined value, the core 23 of the vibrating device 20 will be in its upper position so that the contacts 24 and 25 will be disengaged, and both of the field windings 16 and 17 will be energized. The counter electromotive force machines 12 and 13 will consequently operate as motors and the armatures 14 and 15 rotated. As above mentioned, when the field winding 17 is energized there will be developed in the armature 15 a counter electromotive force equal to the voltage across the exciter mains 6—9. If no counter electromotive force was developed by the armature 14, it is evident that the voltage across the terminals of the field winding 10 would be equal to the voltage between the positive exciter main 9 and the intermediate point 18 of the battery. As stated above, however, the counter electromotive force machine 12 is so designed that at this time the armature develops sufficient counter electromotive force to reduce the voltage across the terminals of the field winding 10 to a value equal to the voltage between the intermediate point 18 and the negative exciter main 6. Current flows from the positive exciter main 9 through the armature 12, field winding 10 to the intermediate point 18 of the battery. The booster 8 is so designed that when the current flows through the field winding 10 in the direction just traced, the voltage generated thereby bucks the voltage across the exciter mains 6—9. Consequently the voltage across the field winding 4 is decreased causing in turn a decrease in the voltage supplied to the line 2.

Now supposing the voltage of the circuit 2 to be below the desired predetermined value, the core 23 will be in its lower position so that contacts 24 and 25 will be in engagement. The field winding 17 will then be short-circuited at contacts 24 and 25. The field winding 16, however, is energized and the counter electromotive force machine 12 will consequently operate as a motor as stated above, and the armatures 14 and 15 rotated. Under these conditions, however, there will be developed in the armature 14 a counter electromotive force equal to the voltage across the exciter mains 6—9, and no voltage will be developed in the armature 15. Therefore it will be evident that the voltage between the intermediate point 18 and the negative exciter main 6 is impressed upon the field winding 10 and current will flow from the intermediate point 18 through the field winding 10, armature 15 to the negative exciter main 6. It will be observed that the same amount of current now flows through the field winding 10 as when the contacts 24 and 25 were open, but it is in the opposite direction so that the voltage generated by the booster 8 aids the voltage across the exciter mains 6—9. Consequently the voltage across the field winding 4 is increased, causing in turn an increase in the voltage of the circuit 2. The booster 8 is designed so that the electromotive force produced thereby, if allowed to act continuously in one direction, is greater than any variation of the electric condition of the main circuit which is likely to occur. Therefore, although the operation of only one vibration of the vibrating device 18 has been described, it will be understood that the vibrating device will be in rapid vibration, and by controlling the energization of the field windings 16 and 17 and thereby the counter electromotive forces developed by the armatures 13 and 14, the potential of the booster will be continually reversed at slightly varying periods. The summation of these applications of potential in opposite directions serves to effect the desired regulation by reason of the fact that the duration of the impulses in that direction which oppose the variation of potential in the main circuit is, by the automatic operation of the regulator, greater than the duration of the impulses in the opposite direction.

While I have herein shown and described one modification of my invention, I do not desire to be limited to the exact arrangement shown and described, but seek to cover in the appended claims all of those modifications which come within the true spirit and scope of my invention.

What I claim as new and desire to secure by Letters Patent of the United States, is:

1. A regulating system comprising a regulating generator, a source of electromotive force having three terminals, each of which is at a different potential with respect to the other terminals, connections between one of said terminals and one end of the field coil of said regulating generator, two counter electromotive force machines having their armatures connected in series across the other two of said terminals, the other end of said field coil being connected to a point between the armatures of said machines, and means for varying the fields of said machines to continually reverse the field current of said regulating generator.

2. A regulating system comprising a regulating generator, a battery having three terminals, each of which is at a different potential, connections between one of said terminals and one end of the field coil of said regulating generator, two counter electromotive force machines having their armatures connected in series across the other two of said terminals, the other end of said field coil being connected to a point between the armatures of said machines, and means for varying the fields of said machines to continually reverse the field current of said regulating generator.

3. In combination with an electric circuit to be regulated, a regulating system comprising a regulating generator, a source of electromotive force having three terminals, each of which is at a different potential with respect to the other terminals, connections between one of said terminals and one end of the field coil of said regulating generator, two counter electromotive force machines having their armatures connected in series across the other two of said terminals, the other end of said field coil being connected to a point between the armatures of said machines, a short-circuit normally around the field winding of one of said machines, and means for opening said short-circuit on a predetermined variation from normal of an electrical condition of the circuit to be regulated to reverse the field current of the regulating generator.

4. In combination with an electric circuit to be regulated, a regulating system comprising a regulating generator, a battery having three terminals, each of which is at a different potential, connections between one of said terminals and one end of the field coil of said regulating generator, two counter electromotive force machines having their armatures connected in series across the other two terminals, the other end of said field coil being connected to a point between the armatures of said machines, a short-circuit normally around the field winding of one of said machines, and means for opening said short-circuit on a predetermined variation from normal of an electrical condition of the circuit to be regulated to reverse the field current of the regulating generator.

5. A regulating system comprising a regulating generator, a source of electromotive force having three terminals, each of which is at a different potential with respect to the other terminals, connections between one of said terminals and one end of the field coil of said regulating generator, two counter electromotive force machines having their armatures connected in series across the other two of said terminals, the other end of said field coil being connected to a point between the armatures of said machines, one of said machines having a low resistance field winding and the other having a high resistance field winding, and vibratory means for continually opening and closing a short-circuit around said high resistance field winding to continually reverse the field current of said regulating generator.

6. A regulating system comprising a regulating generator, a battery having three terminals, each of which is at a different potential, connections between one of said terminals and one end of the field winding of said regulating generator, two counter electromotive force machines having their armatures connected in series across the other two of said terminals, the other end of said field winding being connected to a point between the armatures of said machines, one of said machines having a low resistance field winding and the other having a high resistance field winding, and vibratory means for continually opening and closing a short-circuit around said high resistance field winding to continually reverse the field current of said regulating generator.

In witness whereof I have hereunto set my hand this 12th day of August, 1919.

FRED H. WINTER.